MAGNETIC FILM MEMORY WITH LOW DRIVE CURRENT REQUIREMENTS

Filed May 4, 1966 2 Sheets-Sheet 1

INVENTORS
JAMES M. DAUGHTON
GEORGE E. KEEFE

BY Charles P. Boberg
ATTORNEY 3,456,248
MAGNETIC FILM MEMORY WITH LOW DRIVE CURRENT REQUIREMENTS James M. Daughton, Essex Junction, Vt., and George E. Keefe, Montrose, N.Y., assignors to International Business Machines Corporation, Armonk, N.Y., a corporation of New York Filed May 4, 1966, Ser. No. 547,617
Int. Cl. G11c *11/10, 5/08*
U.S. Cl. 340—174 7 Claims

ABSTRACT OF THE DISCLOSURE

The operation of coupled-film memory devices is improved by applying a steady bias field along the hard axes of the films in the direction of the intermittent word fields for the purpose of preventing wall creep in the films that otherwise may be caused by stray intermittent fields. In a pair of magnetostatically coupled films it is found that this anti-creep bias field can have a magnitude of between 0.5 and $1.0H_K$ (the anisotropy fields of each film) without causing the magnetization of each film to deviate by more than a small angle from the easy axis of the film during the intervals between word current pulses. The large value which the bias field may have in this case greatly reduces the word drive current requirement to 50 percent or less of the amplitude otherwise needed.

This invention relates to magnetic film data storage systems, particularly those in which the storage elements consist of paired magnetic films.

A serious problem which is apt to be encountered in the use of data storage elements that are made of the commonly used film materials is the tendency of such elements, under certain conditions, to lose their stored data by a phenomenon known as "creeping." Creeping may occur when a film is subjected to intermittent stray magnetic fields of a certain strength, directed along the magnetic hard axis of the film, which cause the magnetization of a film to change from Neel walls (in which the magnetic moments are directed parallel to the film surface) to Bloch walls (in which the magnetic moments are directed perpendicular to the film surface), or vice versa.

It has been proposed heretofore to prevent creeping in single-film magnetic storage systems by applying a steady bias field of a predetermined strength along the hard axis of each film. This anti-creep bias field can point in either direction along the hard axis. If it points in the same direction as the hard-axis field supplied by one of the orthogonal drive currents (for example, the word current in a closed-easy-axis type of memory system), it tends to reduce the amplitude of the current pulses that must be supplied by the drive circuitry to the films. The bias field in this instance supplies a part of the needed drive field which otherwise would have to be supplied entirely by the drive current.

In memory systems which use single-film storage elements, the amount of anti-creep bias which can be usefully employed is on the order of 0.2 to $0.3H_K$, where $H_K$ is the anisotropy field of the film, i.e., the total field which theoretically must be applied along the hard axis in order to rotate the magnetization of the film completely into the hard direction. Under practical operating conditions, however, the word field which is utilized for switch- or reading purposes may be 1.5 or 2 times $H_K$. Hence, a hard-axis bias of only 0.2 or 0.3 $H_K$ will effect some reduction of word current, but this may be a comparatively small saving of the total drive power which the system requires. If the hard-axis bias is made larger than this, the single-film memory element is apt to be rendered unduly sensitive to stray magnetic fields applied either along its hard axis or easy axis, and its output signal is reduced by the fact that the remanent magnetization vector is displaced by a comparatively large angle from the film's easy axis due to the transverse bias field.

Faced with the possible disadvantages of using hard-axis bias under the above-described conditions, memory designers and builders may decide to forego the advantages of hard-axis bias and direct their efforts instead toward the development of memories using film materials that are inherently creep-free without the use of such bias, even though such a course is likely to increase the expense of building and operating memory systems. Sacrificing a limited saving of hard-axis drive power may be preferred to utilizing an anti-creep scheme which requires the provision of a special biasing means that itself may consume some power.

The present invention is based upon the discovery that when hard-direction bias is applied to coupled magnetic films (as distinguished from the signal magnetic films to which it has been applied heretofore), an unexpectedly great reduction of the drive current requirements can be achieved, so great in fact that this may justify the use of hard-direction bias in spite of all adverse considerations. Rather than being held to limit of 0.2 to $0.3H_K$ as in the case of single storage films, the hard-direction bias in a coupled film structure can range from 0.5 to $1.0H_K$ without rendering the device unstable with respect to stray fields and without seriously reducing the output signal. This results in a drastic reduction of drive current requirements, thereby effecting a commensurate saving of drive power and also reducing the stray fields which are the cause of creeping. A very substantial increase in the manufacturing yield of acceptable memory elements also is realized.

It is not known at present why a coupled-film memory device is able to utilize a hard-direction bias having a magnitude comparable to that of its anisotropy field without becoming unstable and without unduly weakening its output signal. An object of the present invention is to make use of this unexpected property in order to provide a creep-free memory system with greatly reduced drive current requirements, the reduction being on the order of 50 percent or more as compared with an unbiased memory system.

A further object of the invention is to utilize hard-direction bias for increasing the bit-disturb margins and thereby improving the yield of the magnetic film memory elements.

The foregoing and other objects, features and advantages of the invention will be apparent from the following more particular description of a preferred embodiment of the invention, as illustrated in the accompanying drawings.

In the drawings:

FIG. 1 is a fragmentary perspective (and partially schematic) view showing a closed-easy-axis type of magnetic film memory system in which the invention is embodied.

FIGS. 2 and 3 are sectional views taken on the lines 2—2 and 3—3, respectively, on FIG. 1.

Figure 1:
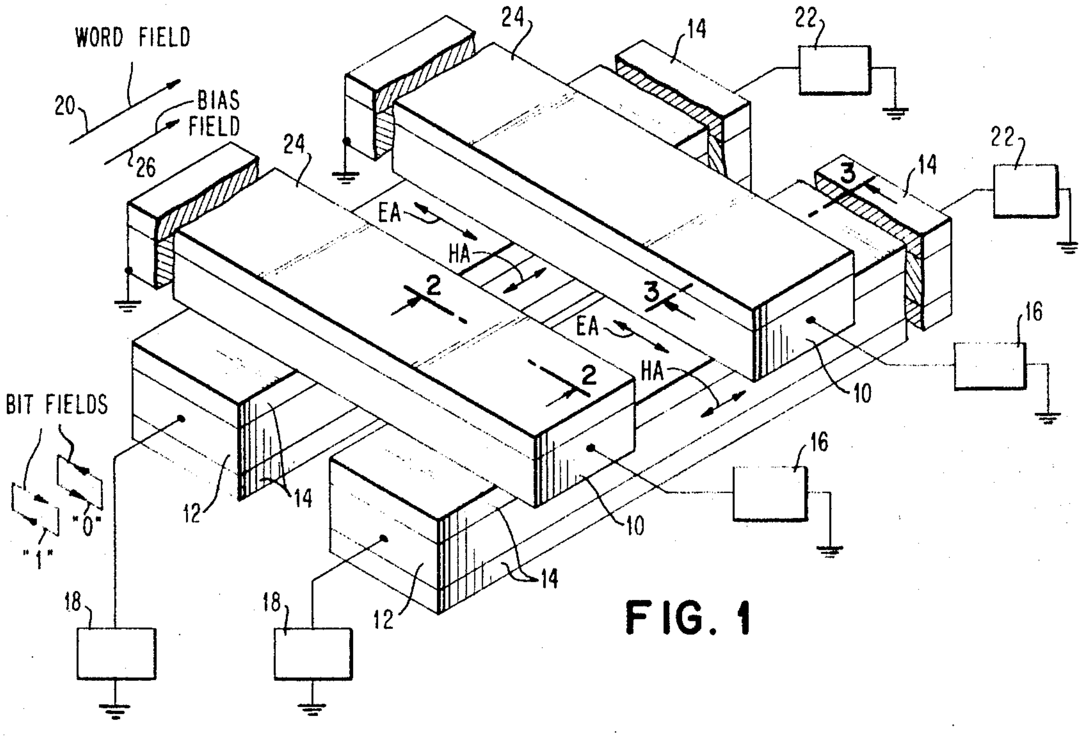

Referring now to FIG. 1, this view illustrates in a general way a word-oriented, closed-easy-axis (CEA) type of memory construction, it being understood of course that this is only one form of memory system in which the principle of the invention may be embodied. A set of parallel word lines 10 in the form of flat conductive strips is arranged substantially at right angles to a set of parallel bit-sense lines 12, also in the form of flat conductive strips. Each bit-sense line 12 is disposed between two strip-like magnetic films 14, FIGS. 1, 2 and 3, which are substantially coextensive with the line 12. The films 14 preferably are composed of uniaxially anisotropic magnetic material, each film 14 having an easy axis EA oriented transversely of its length, along which axis the remanent magnetization vector of the film tends to lie when the film is in its quiescent state. It should be noted also that in this type of memory device the respective magnetizations of the top and bottom films 14 of each film pair normally are antiparallel; that is, the magnetization vectors of these films normally tend to point in opposite directions along the easy axis EA, as shown in FIG. 2, thereby establishing a magnetostatic coupling between the films of a pair.

Figure 2:
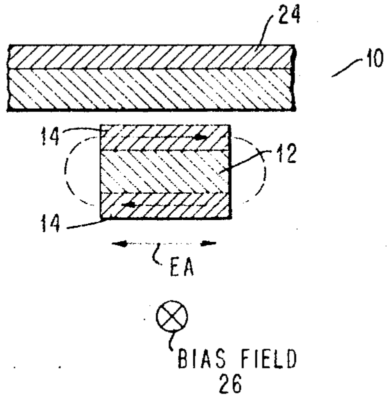

Although the magnetic path through the two films of a pair may include short air gaps along the sides of the strip conductor 12, as shown in FIG. 2, nevertheless it is customary to describe this as a "closed" flux path, by contrast with the more open type of flux path that exists in a single flat film which is not magnetostatically coupled to another nearby film. It is also within the contemplation of this invention that the edges of the strip conductor 12 may be covered with magnetic material so as to provide a truly closed flux path around each conductor 12. The clockwise or counterclockwise direction of the magnetization in this closed flux path indicates that a binary "1" or binary "0" bit is stored in that cell or storage position.

Bit storage positions are defined at the locations of the respective crossovers between the word lines 10 and the bit-sense lines 12, with those portions of the magnetic films 14 which are at, or in the vicinity of, each crossover location constituting a single bit storage cell. As previously indicated, each of these cells has an easy axis EA extending transversely of the respective bit-sense line 12, and it also has a hard axis HA extending parallel with the respective bit-sense line 12. In order to store or "write" binary information into all the cells of a given word line or column, the related word conductor 10 is energized by a pulse of current in a given direction, furnished by a word driver 16, FIG. 1. Concurrently therewith each of the bit-sense lines 12 may receive a pulse of current having one polarity or the other according to the information which is to be stored in each of the cells along that word line, such bit current pulses being furnished by bit drivers 18 associated with the lines 12.

According to the well-known orthogonal-switching mode of operation, the combination of the word field 20 applied along the various hard axes HA and the "1" or "0" bit fields applied along the easy axes EA of the film strips 14 causes each of the film pairs to assume a clockwise or counterclockwise magnetization (as viewed in cross-section, FIG. 2) when the apparatus is restored to its normal or quiescent state. It is apparent that the polarity of the bit current pulse flowing through each bit-sense line 12 determines the clockwise or counterclockwise orientation of the closed flux, this bit current pulse being terminated at a slightly later time than the word current pulse so as to insure the desired orientation.

Certain portions of the structure normally associated with a memory system of this character have been omitted from the present showing in order to enhance the clarity of illustration. Thus, for instance, all insulation separating the magnetic films 14 from the word lines 10 and other adjacent conductive members has been omitted from FIGS. 1–3. Likewise, the conductive ground plane on which the memory elements customarily are supported, and which also serves as a return path for the various drive currents, has been omitted from these views.

Figure 3:
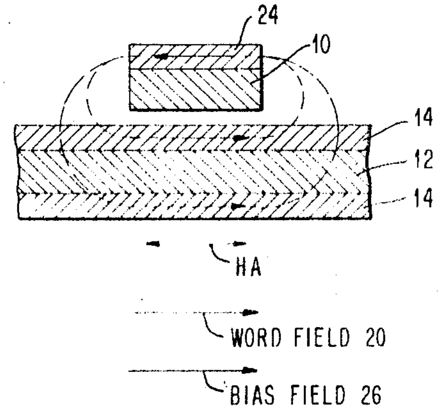
Figure 4:
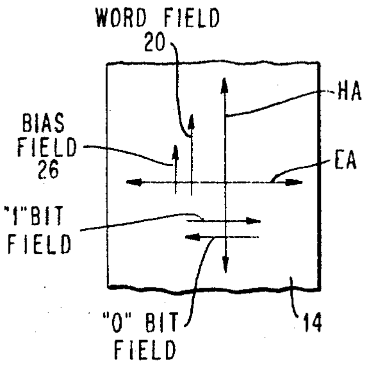
FIG. 4 is a fragmentary plan view of a magnetic film memory element showing the directions of the various fields that may beapplied thereto in accordance with the invention.

FIG. 4, in conjunction with the preceding views, shows the relationship of the hard and easy axes HA and EA and the respective directions of the "1" bit field, the "0" bit field, and the word field 20 in the upper film 14 of a bit-storage cell. It should be noted in this connection that application of the word field 20 to a bit storage cell temporarily induces parallel (rather than antiparallel) magnetizations along the hard axis HA in the upper and lower films 14 of a pair, as shown in FIG. 3. When the magnetization vectors of the two films 14 are pointing the same direction, this is said to be an "open flux" relationship of the vectors. In order to afford some partial closure for the hard-axis flux of each cell, the word lines 10 often are provided with "keeper" strips 24 of magnetic material which, as shown in FIG. 3, partially close the hard-axis flux path of each cell. Alternatively, a single, continuous sheet of keeper material may be mounted in association with all of the word lines.

When binary information stored in a given word line or column is to be read out, a current pulse is sent through the respective word line 12 by the associated word driver 16, FIG. 1. Depending upon whether a destructive or nondestructive readout is desired, the resulting word field 20 induced by the read word pulse may rotate the magnetization of each storage element or cell in that word column completely into its hard-axis position or only partially toward that position. It will be assumed herein that maximum rotation is imparted to the magnetization vector of each film in the word line by the word field 20, thereby necessitating a concurrent rewriting operation or a new writing operation to replace the bits which are read out. As a bit is read (that is, when the magnetization vector of its cell is rotated as just described), an electrical signal voltage is generated in the corresponding bit-sense line 12, and this signal voltage passes to a sense amplifier 22, FIG. 1 associated with that line to be amplified for, use in the output circuitry of the system. Of all the storage cells which are located on a given bit line or row only one cell in this row can be activated at a given time, inasmuch as only one word line 10 at a time is energized.

Figure 5:
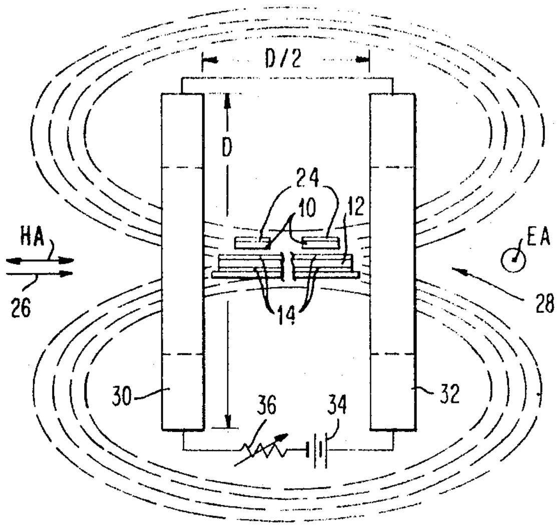
FIG. 5 illustrates one form of hard-direction biasing means which utilizes a solenoid of Helmholtz coil arrangement for supplying the required bias field.

To prevent the loss of stored information by creeping in accordance with the present invention, a steady bias field 26, FIGS. 1–4, of a certain magnitude is applied constantly to all of the coupled magnetic films 14 in the storage array. One possible way of supplying this bias is by utilizing a large solenoid or a Helmholtz coil assembly 28, as shown in FIG. 5 which includes a pair of serially connected coils 30 and 32 energized by a direct-current source 34 through a variable resistor 36. The two coils are separated by a distance equal to one-half the diameter D of the coils, this distance being sufficient to accommodate a memory plane of the above-described type between the coils 30 and 32. This type of coil arrangement provides a uniform magnetic field for biasing all of the storage elements along their hard axes. The direction of the bias field 26 applied by the biasing means preferably is in the same direction as the word field 20 FIG. 4, which is induced intermittently as needed by a word current pulse, thereby reducing the word current requirement as explained hereinabove. The bias field 26 in the case of coupled-film storage elements, can be from 0.5 to 1.0 $H_K$, where $H_K$ is the anisotropy field of each element. Thus, with the bias field aiding the word field, the word current required to produce temporary hard-axis magnetization of a storage cell can be reduced by as much as 50% or more from the word current amplitude that would be required in an unbiased cell.

The Helmholtz coil arrangement 28 shown in FIG. 5 is not the only means which can be employed to furnish a suitable hard-direction bias field 26. It is also proposed, for example, that each keeper strip 24 be made of anisotropic high-remanence film material having an easy axis disposed transversely of its length. Assuming that the word current pulses which flow in each word line 10 are unidirectional, the associated keeper film 24 will acquire a permanent magnetization along its easy axis which, by magnetostatic coupling with the storage films 14, FIG. 3, will impress a constant hard-direction bias field upon the films 14. Still other hard-axis biasing means can be devised for the purpose of preventing creep in the storage films.

The application of a constant hard-direction bias field 26 to each film pair prevents the magnetization vectors of the films from returning into complete alinement with the easy axis. Hence, there will be some loss of signal for this reason during readout. However, the angle which each magnetization vector makes with its easy axis during the normal quiescent state of the film is found to be relatively small, even though the bias field is a major fraction of, or is equal to, the anisotropy field, and the consequent reduction of sense signal amplitude is not great enough to be a problem. It is necessary, of course, that the normal displacement angle be small enough so that the storage elements are not sensitive to bit-disturb pulses on the bit-sense lines 12.

Figure 6:
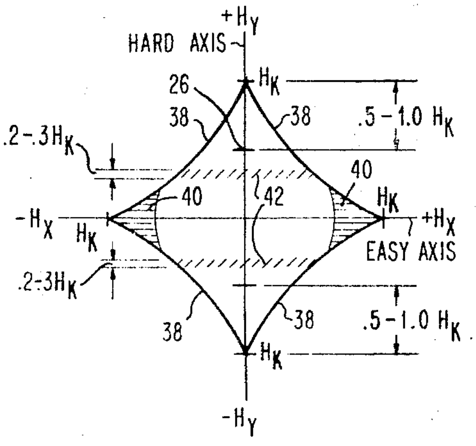
FIGS. 6 and 7 are diagrams showing critical curves for different types of storage elements to which the invention may be applied, FIG. 6 relating to a thick magnetic film and FIG. 7 to a thin magnetic film.
Figure 7:
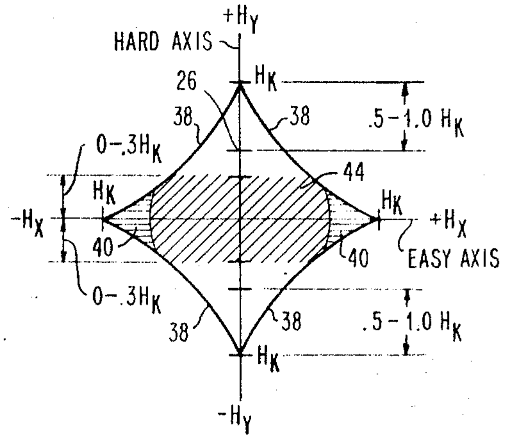

The critical curve diagrams in FIGS. 6 and 7 illustrate some of the experimentally observed considerations which are involved in the use of hard-direction bias to prevent film creep. As is well known, an asteroidal critical curve 38 represents the threshold at which rotational switching of a uniaxially anisotropic film may occur for various combinations of hard-axis magnetizing field $H_y$ and easy-axis magnetizing field $H_x$ under the well-known conditions which are necessary for such operation. A magnetic field or a combination of magnetic fields having a resultant magnitude falling outside an asteroid 38 irreversibly switches the film by the fast rotational process. The film also is irreversibly switched, but at a slower rate of speed, by wall motions when applied magnetic fields fall within the horizontally shaded areas 40 of the asteroid.

If the film is subjected to direct current magnetic fields that have magnitudes lying within the asteroid 38 of FIG. 6 or 7 but outside the wall motion areas 40, the film neither switches nor creeps. However, if the magnetic field applied to a film has an alternating current or intermittent component in the hard direction (i.e., along the $H_y$ axis) within a certain range of values, the magnetization of the film will creep and the stored information will subsequently be destroyed by the creeping process. If the film is a thick film, i.e., greater than approximately 900 Angstroms, the creep is produced by Bloch-Neel-Bloch wall transitions which occur in response to intermittent hard-direction magnetic fields of from $0.2H_K$ to $0.3H_K$, indicated by the diagonally shaded lines 42 in FIG. 6. If the film is a thin film, i.e., of a thickness less than about 900 Angstroms, the creep is produced by Bloch-line motions in the cross-tie walls which occur in response to intermittent hard-direction magnetic fields of from zero to about 0.2 or $0.3H_K$, indicated by the diagonally shaded area 44 in FIG. 7 of the drawings.

In the operation of a coupled-film-memory system according to the present invention, regardless of whether each film is a thick or a thin film, a direct-current bias field 26 having a value at least equal to $.5H_K$ at the surface of each film 14 is applied to the films 14 continuously along their hard axes, as already explained herein, thereby preventing Bloch-Neel or Neel-Bloch wall transitions that otherwise might be caused by stray word fields acting upon a film. This bias field 26 is in the same direction as that in which the word fields 20 are applied. Such a bias field prevents creeping in response to word-disturb fields, greatly reduces the word current requirement and improves the bit-disturb margins by very substantial amounts. The reduction of word current in turn reduces the stray word fields, thereby still further reducing the disturb sensitivity.

The measures which have been described heerinabove for preventing creep are especially effective when keepers 24, FIGS. 1–3, are utilized in conjunction with, or as part of, the hard-direction biasing means. The keeper helps to concentrate the hard-axis flux where it is needed and reduces hard-axis demagnetizing fields. Best results are obtained when low-dispersion films are used in this type of system.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic memory system comprising:

a set of first parallel conductors for conducting electric current pulses, an array of magnetic film storage elements each including at least a pair of anisotropic magnetic films respectively arranged on opposite sides of a respective one of said first conductors so that films of said pair are capable of being magnetostatically coupled in an approximately antiparallel relationship as determined by the current flow through said conductor, the films of each pair respectively having easy axes extending substantially parallel to one another, each of said films also having a hard axis substantially at right angles to its easy axis and being capable of experiencing unwanted transitions between Neel walls and Bloch walls in the event that such film is subjected along its hard axis to a net magnetizing force of variable magnitude that intermittently varies within a predetermined range of values, all of which are substantially less than the anisotropy field of the film, at least one set of second parallel conductors arranged in transverse relation to said first set of conductors and positioned on one side of said array of storage elements, each of said second conductors being adapted to conduct electric current pulses for intermittently inducing magnetizations wholly or partially transverse to said second conductor in at least certain of the film pairs which are located at the respective crossovers between said second conductor and said first conductors, and hard-direction biasing means for applying to each of said film pairs along the hard axes thereof a steady magnetic field having a magnitude exceeding a limiting value of said predetermined range of values so as to prevent the net magnetizing force applied along the hard axis of each film from falling within said predetermined range of values, thereby to prevent unwanted transitions between Neel walls and Bloch walls in said films when the same are subjected to intermittent magnetic fields along their hard axes during the operation of the memory system, but also having a magnitude such that it causes the respective film magnetizations to be displaced from their easy axes by angles substantially less than ninety degrees during the times when said first and second conductors are not conducting currents.

2. A memory system as set forth in claim 1 wherein said biasing means is adapted to supply a bias field having a magnitude on the order of from 50 to 100 percent of the average anisotropy field of the films.

3. A memory system as set forth in claim 1 wherein said storage elements are arranged in word columns and bit rows, said first conductors respectively extending along the bit rows for applying bit fields intermittently to selected storage elements, said films being oriented with their easy axes substantially at right angles to said first conductors, said second conductors respectively extending along the word columns for applying word fields intermittently in a given direction along the hard axes of selected storage elements, and said biasing means being so oriented as to apply its bias field in said given direction also, thereby to limit the magnitude of the current pulses which are needed in said second conductors for inducing hard-axis magnetizations in the film pairs of the selected storage elements.

4. A memory system as set forth in claim 3 wherein said biasing means is adapted to supply a biasing field having a magnitude on the order of from 50 to 100 percent of the average anisotropy field of the films.

5. A memory system as set forth in claim 4, further comprising keeper means positioned on the side of said second conductors opposite the side thereof on which said storage elements are positioned for at least partially closing the magnetic flux path of any film pair which is magnetized in a hard-axis direction by the combination of the bias field and word field, said keeper means constituting at least a part of said biasing means.

6. A magnetic memory system comprising:

a set of first parallel conductors for conducting electric current pulses, an array of magnetic film storage elements each including at least a pair of anisotropic magnetic films respectively arranged on opposite sides of a respective one of said first conductors so that the films of said pair are capable of being magnetostatically coupled in an approximately antiparallel relationship as determined by the current flow through said conductor, the films of each pair respectively having easy axes extending substantially parallel to one another, each of said films also having a hard axis substantially at right angles to its easy axis, at least one set of second parallel conductors arranged in transverse relation to said first set of conductors and positioned on one side of said array of storage elements, each of said second conductors being adapted to conduct electric current pulses for intermittently inducing magnetizations wholly or partially transverse to said second conductor in at least certain of the film pairs which are located at the respective crossovers between said second conductor and said first conductors, and hard-direction biasing means for applying to each of said film pairs along the hard axes thereof a steady magnetic field which is in the same general direction as the transverse magnetizations induced in said films by the current pulses in those ones of said conductors that are in transverse relation to said hard axes, said biasing means being so constituted as to apply to each film pair a bias field the magnitude of which is at least one-half the average anisotropy field of said films and also of such value that said bias field causes the respective magnetizations of said films to be displaced from their easy axes by angles substantially less than ninety degrees during the intervals when said first and second conductors are not conducting currents.

7. A magnetic memory system as set forth in claim 6 wherein said storage elements are arranged in word columns and bit rows, said first conductors respectively extending along the bit rows for applying bit fields intermittently to selected storage elements, said films being oriented with their easy axes substantially at right angles to said first conductors, said second conductors respectively extending along the word columns for applying word fields intermittently in a given direction along the hard axes of selected storage elements, and said biasing means being so oriented as to apply its bias field in said given direction also, thereby to limit the magnitude of the current pulses which are needed in said second conductors for inducing hard-axis magnetizations in the film pairs of the selected storage elements.

References Cited

UNITED STATES PATENTS

| | | | |
|---|---|---|---|
| 3,188,613 | 6/1965 | Fedde | 340—174 |
| 3,270,327 | 8/1966 | Davis | 340—174 |
| 3,320,597 | 5/1967 | Hart | 340—174 |
| 3,375,503 | 3/1968 | Bertelsen | 340—174 |

BERNARD KONICK, Primary Examiner

BARRY L. HALEY, Assistant Examiner